United States Patent [19]

Schwarzenbart

[11] Patent Number: 5,197,411
[45] Date of Patent: Mar. 30, 1993

[54] PET BED

[76] Inventor: Cheryl A. Schwarzenbart, 714 Pebble Beach Dr., Madison, Wis. 53717

[21] Appl. No.: 767,833

[22] Filed: Sep. 30, 1991

[51] Int. Cl.$^5$ .......................................... A01K 1/035
[52] U.S. Cl. ................................... 119/28.5; 5/420
[58] Field of Search ............... 119/28.5, 19; 5/417, 5/420, 424, 425, 427, 428, 442, 446, 464, 465, 474

[56] References Cited

U.S. PATENT DOCUMENTS

| | | |
|---|---|---|
| D. 212,009 | 8/1968 | Madlem . |
| D. 216,400 | 12/1969 | Schwertley . |
| D. 221,558 | 8/1971 | Zimmerman . |
| D. 309,199 | 7/1990 | McMahon . |
| 1,569,710 | 1/1926 | Burt . |
| 1,738,411 | 12/1929 | Welch . |
| 2,552,476 | 5/1951 | Barton ............................ 5/420 |
| 3,488,684 | 1/1970 | Wrightson ........................ 5/420 |
| 3,803,646 | 4/1974 | Newerowski . |
| 3,902,456 | 9/1975 | David ........................... 119/28.5 |
| 3,989,008 | 11/1976 | Neumann ........................ 119/28.5 |
| 4,173,048 | 11/1979 | Varaney ........................... 5/442 |
| 4,434,513 | 3/1984 | Welch ............................. 5/425 |
| 4,766,627 | 8/1988 | Landry ........................... 5/446 |
| 4,788,726 | 12/1988 | Rafalko . |
| 4,860,689 | 8/1989 | Stewart ........................ 119/28.5 |
| 4,999,866 | 3/1991 | Lindsey ........................... 5/427 |
| 5,002,014 | 3/1991 | Albin ........................... 119/28.5 |
| 5,010,843 | 4/1991 | Henry ........................... 119/28.5 |
| 5,035,013 | 7/1991 | Bloom ............................. 5/420 |

FOREIGN PATENT DOCUMENTS 2585228  1/1987  France ............................ 5/427

OTHER PUBLICATIONS

Photocopy of a hand tag from a pet bed available from Alpha Innovative Products, Inc. of Tulsa, Oklahoma.

Primary Examiner—John J. Wilson
Assistant Examiner—Todd E. Manahan
Attorney, Agent, or Firm—Stroud, Stroud, Willink, Thompson & Howard

[57] ABSTRACT

A pet bed which is flexible and compliant to any surface of furniture or flooring and protects the same from damage by the pet. The pet bed includes a bed body which has a continuous edge, and a roll with a relatively uniform cross section, which extends around a major portion of the edge to enclose a major portion of the bed body. Both the bed body and roll include a batting or padding material which has a drape similar to that of a sleeping bag or bed comforter. The roll has a greater cross section than the bed body, thus, providing a head rest or the like for the pet.

2 Claims, 2 Drawing Sheets

PET BED

TECHNICAL FIELD

The invention relates generally to accessories for domestic animal care, and more specifically to a pet bed. The pet bed of the present invention is particularly well adapted to provide a resting surface which is conformable to any piece of furniture or flooring as well as to protect the furniture and flooring from damage by the pet.

BACKGROUND OF THE INVENTION

In many instances, a household pet is considered as a family member. As such, the pet is deserving of comfortable accommodations, especially for sleeping.

To provide a comfortable resting surface, numerous animal beds have been described in the prior art and are commercially available. Most pet beds are meant to be placed on the floor, and the pet is expected to make this location and bed its resting and sleeping place. One such pet bed, commercially available from Alpha Innovative, Products, Tulsa, Okla., is a carpet-like piece wherein the pile are a synthetic lambs wool.

More commonly, pet beds of the prior art consist of a "lying down" surface which is surrounded with vertical wall sections. Typically, the overall outside configuration of the pet bed is circular, with an annular sidewall and a circular wall forming the bottom of the bed. Often, the beds consist of baskets, for example, woven of wicker, in in the shape of the basket is placed.

This as well as other types of pet beds have been disclosed and patented in the prior art. For example, U.S. Pat. Nos. 216,400; 221,558; 212,009; and 309,199 disclose circular or the like beds with raised sidewalls. Other patents disclose pet mattresses or pillow-like beds. For example, U.S. Pat. No. 5,002,014 discloses an animal mattress with a liquid impervious outer casing and heat expanded polystyrene beads as cushioning material. U.S. Pat. No. 5,010,843 discloses a pet bed with a pair of opposed semi-circular cushions forming a pocket into which the pet may crawl. U.S. Pat. No. 1,569,710 discloses a dog mat having a concave upper surface and a beveled edge. U.S. Pat. No. 3,902,456 discloses a pet pillow having a doughnut-shaped sidewall filled with resiliently compressible stuffing.

Still other patents disclose more elaborate resting structures. For example, U.S. Pat. No. 4,860,689 discloses a pet lounge having a base, a body support platform and a bolster surrounding at least a portion of the body support platform. U.S. Pat. No. 3,989,008 discloses a pet bed with two resting areas which are vertically disposed with respect to each other.

While there appears to be a myriad of prior art beds, few, if any, offer the pet any options in the manner of using the pet bed. Moreover, it frequently occurs that the pet "decides" where it wants to sleep or rest. Moreover, efforts to dissuade the pet from using such a spot are usually unsuccessful. Cats, particularly, are known for finding their own sleeping places, usually on furniture such as chairs, sofas or beds, much to the consternation of an owner who may have placed a pet bed on the floor.

Even if the pet owner is successful in coercing a pet to use a bed placed on the floor, continuous use of the bed (or any spot, e.g., on a chair or sofa) quickly becomes a source of pet hair buildup, soil, spilled liquids such as saliva and urine, and bacterial, flea and tick growth. For example, as the beds absorb water and organic liquids, they begin to develop into an ideal environment for fleas and ticks to live for extended periods of time. The body heat absorbed from the animal lying on the bed also contributes to the breeding environment Also, over a period of time, the beds can begin to promote bacterial growth due to build up of moisture and heat. Such conditions lead to an unhealthy environment for the animal lying on the bed as well as for other members of the pet's "family."

Despite recognition that a pet bed can breed a rather beds are extremely difficult and sometimes impossible to thoroughly clean. Most are big, bulky, and rigid, and constructed of fabric, such as fake fur, which is not readily washable. Accordingly, there is still a need in the animal care industry for a pet bed which is easy to clean, promotes good hygiene, is economical to manufacture, and is, at the same time, usable on any surface which the pet decides it wishes to sleep or rest such as a bed, the back of a sofa or a floor.

SUMMARY OF THE INVENTION

The present invention provides a pet bed which is usable on any surface of furniture and flooring to provide both a resting surface for the pet and protection of furniture and flooring from the pet. The pet bed is simple in construction, strong, durable, and machine washable and dryable.

In one of its aspects, the invention is a flexible pet bed which has sufficient drape to generally conform to any surface upon which the pet bed is placed. The pet bed includes a bed body having a continuous peripheral edge, and a roll having a relatively uniform cross section. The roll is peripherally joined to the edge to substantially surround the bed body.

The bed body includes a backing and a facing and has an interior chamber. The facing and backing are configured and joined together in face-to-face relationship to define the interior chamber. The interior chamber holds a resiliently compressible padding material such as a batting.

The roll also includes a resiliently compressible padding material, such as a batting, a fiberfill or a combination of both, and an enclosure surrounding and holding the second padding material.

In an illustrated embodiment, the pet bed has a generally semi-circular configuration, with the roll around only the arcuate portion of the bed.

The pet bed is suitably made entirely of materials which are machine washable and dryable. Because of ease of cleaning of the pet bed, buildup of hair, soil and organisms is virtually eliminated. The pet bed of the present invention, being compliant and capable of conforming to virtually any surface, can be used on top of a chair or sofa or wherever the pet's sleeping "spot" is. The pet bed is readily transportable and can be used wherever the pet is. For example, it can be used in an automobile when transporting the pet or in a tent when camping.

In another aspect, the present invention is a method of making a pet bed which provides certain production economics, such as reduced and simplied cost of assembly, and thus reduced unit price. The method uses only two panels of fabric plus the padding material. The method in accordance with the present invention includes joining together two congruent panels of fabric to generally form a pocket, which has an open edge and an inner periphery. A batting material configured to fit inside the pocket is then inserted into the pocket. To form the roll, a padding material such as a fiberfill is inserted along the inner periphery of the pocket. The panels and batting material are then joined together at the edge of the padding material to enclose the padding material, forming a roll around the periphery of the pocket. The pet bed is then finished by closing the open edge of the pocket.

Other advantages and a fuller appreciation of the specific adaptations, and physical attributes of the present invention will be gained upon an examination of the following detailed description of the invention, taken in conjunction with the accompanying drawings.

BRIEF DESCRIPTION OF THE DRAWINGS

The preferred exemplary embodiment of the invention will hereinafter be described in conjunction with the appended drawing, wherein like designations refer to like elements, and in which.

DISCLOSURE OF PREFERRED EMBODIMENTS

Figure 2:
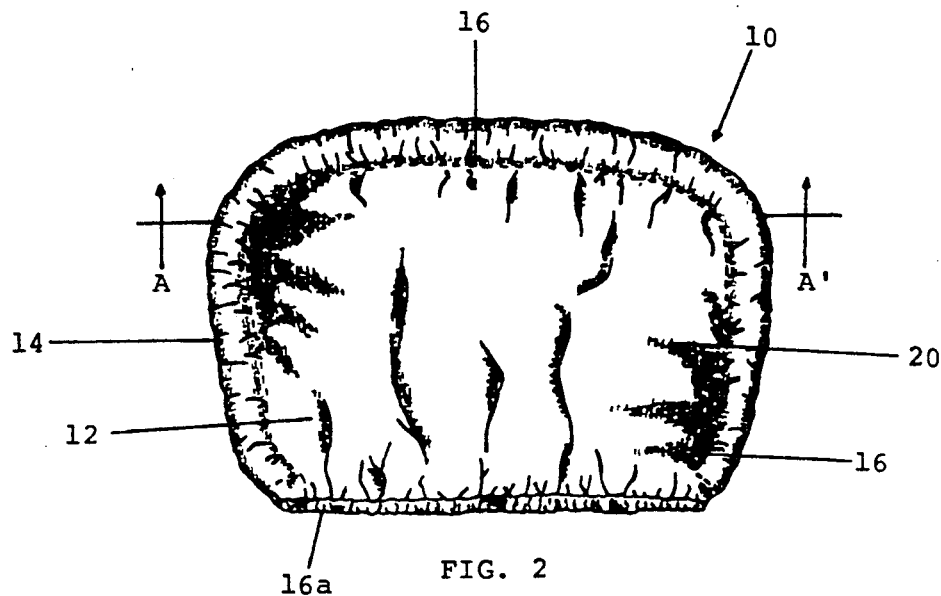
FIG. 2 is a top plan view of a pet bed.

This invention relates broadly to animal care accessories, especially to a resting surface for pets. The present invention provides a pet bed which is especially well adapted for use on any piece of furniture or floor, thus, is useful for protecting furniture or flooring on which a pet has "decided" to rest or sleep, and for promoting good animal and environmental hygiene. The pet bed of the present invention is characterized by several attributes: it is easy to construct, lightweight, durable, and machine washable and dryable with excellent dimensional stability; it possesses drape, making it conformable to any surface and is readily transportable to any location where the pet is. These attributes are achieved through a particular structural arrangement meeting a special combination of physical parameters.

In accordance with the present invention, pets are provided with a bed which is flexible and compliant to any surface, providing a degree of pet comfort. The bed includes a bed body which has a continuous edge, and a roll with a relatively uniform cross section, which extends around a major portion of the edge to enclose a major portion of the bed body. Both the bed body and roll include a batting or padding material which has a drape similar to that of a sleeping bag or bed comforter. The roll has a greater cross section than the bed body, thus, providing a headrest or the like for the pet.

As used herein, the term "drape" is meant to refer to the degree to which a cloth or other object falls, hangs or conforms about an object. The term "substantially surround" is meant to refer to surrounding all or a major portion of the sides or edges of an object. The term "generally conform" is meant to refer to the ability to take on the same or virtually the same form, shape, or conformation of an object. The term "pocket" is meant to refer to a piece of material having two panels peripherally joined but with an open edge. The term "inner periphery" is used to refer to the inside perimeter of a pocket or cavity.

Reference is now made to FIGS. 1-4 depicting a pet bed according to the present invention. The pet bed, generally designated 10, includes a bed body 12 and a roll 14. Bed body 12 has a continuous peripheral edge 16 about which roll 14 extends and is joined thereto, surrounding a major portion of bed body 12. Bed body 12 includes a facing 20 and a backing 22. Facing 20 and backing 22 are joined together, for example, by stitching, in a face-to-face relationship to define an interior chamber 24.

Figure 3:
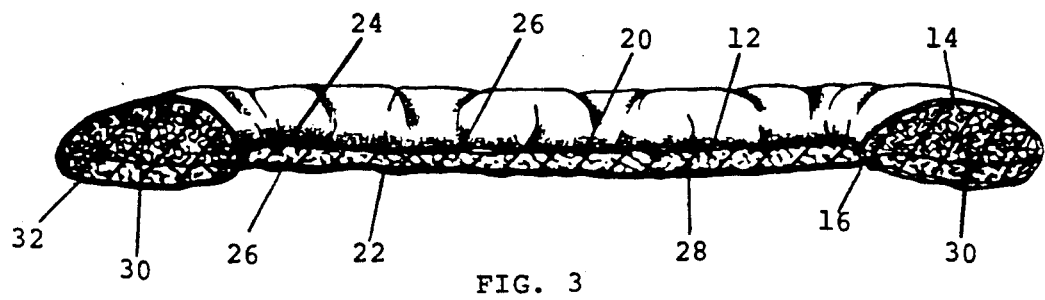
FIG. 3 is a cross-sectional view of a pet bed taken along the plane of the line A—A in FIG. 2.
Figure 4:
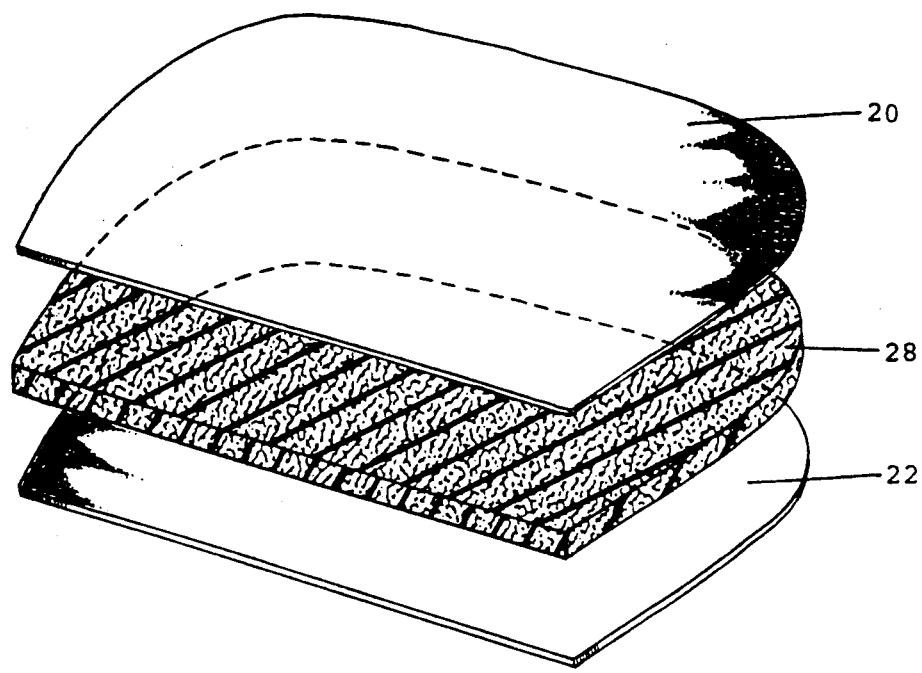
FIG. 4 is an exploded view of a bed body illustrated in FIG. 1.

As best seen in FIGS. 3 and 4, chamber 24 includes a first padding material 26, which is preferably a batting material 28. Batting 28 is sandwiched between facing 20 and backing 22. The roll 14 includes a second padding material 30 which may be the same or different from batting material 28. The amount of padding material 30 is sufficient to permit roll 14 to have a substantially larger cross section than that of bed body 12. The difference in cross section between roll 14 and bed body 12 is in the range of about 2:1. While these cross sections may vary, provided that the pet bed maintains the appropriate drape, a convenient thickness for bed body 12 is about ⅜ in. and that of roll 14 about 1.5 in.

Roll 14 further includes an enclosure 32 surrounding and holding padding material 30. Enclosure 32 of roll 14 is peripherally joined to edge 16 of bed body 12 to substantially surround bed body 12.

In the illustrated embodiment, a minor portion 16a of edge 16 of bed body 12 is not surrounded by roll 14. In this case, the portion 16a remains a straight edge in which facing 20, backing 22 and batting 28 are simply joined together. As described hereinafter, the overall configuration of pet bed 10 is not limited to that shown in the illustrated embodiment, although the illustrated configuration has particular application.

To improve batting stability, i.e., resistance to pulling away from seams and corners, and to add a touch of elegance to the pet bed in accordance with the present invention, bed body 12 can be quilted, i.e., stitched through facing 20, batting 28, and backing 22 at spaced intervals, as is known in the art.

The basic size of the pet bed in accordance with the present invention can be scaled for different pet sizes. A typical size for a cat, for example, is in area about 24-26 inches (in.) by about 16-18 in. with the bed body about 14-16 in.×20-22 in. and the roll about 1.5-2.5 in. in diameter.

Figure 1:
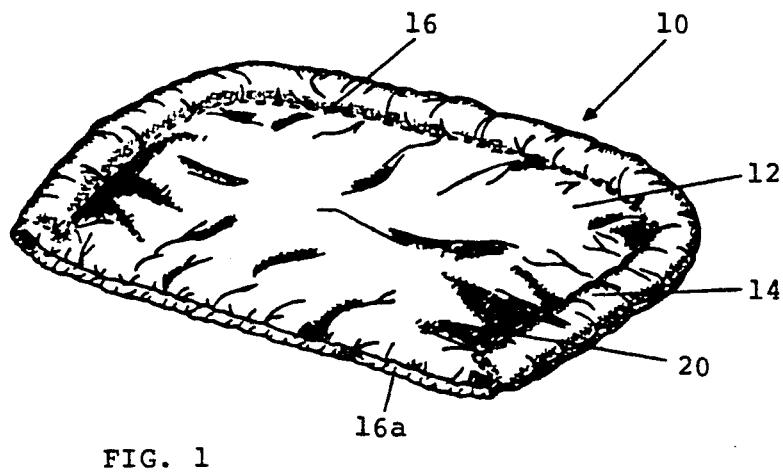
FIG. 1 is a perspective view of a pet bed in accordance with the present invention.

In the illustrated embodiment, as seen in FIG. 1, the outer periphery of the pet bed is a substantially semi-circular configuration. This configuration is particularly well suited for placement against the back of a chair or sofa or to conform to a corner of a bed. The outer periphery of the pet bed in accordance with the present invention is not, however, limited to any particular elliptical, polygonal, etc.

The facing 20, backing 22 and enclosure 32 are made of a fabric with sufficient durability to withstand machine washing and drying, but with sufficient softness to provide a degree of comfort for the pet. In addition, they drape well on any surface. Various fabric materials may be used, the preferred being machine washable and dryable, with good dimensional stability, i.e., good size and shape retention, and decorative fabric that are readily available in a variety of colors and designs at reasonable prices. Preferred materials are soft fabrics such as a cotton or polyester or cotton/polyester blend material.

Batting material 28 has sufficient drape to take on the shape of any surface. Batting 28 is constructed of layers of textile fibers of a uniform thickness (loft) and width. Suitable batting material ranges in weight from about 4 to about 6 ounces (oz) per square yard of material. Typically, a suitable 4 oz batt has a thickness of about ¾ inch (in) while a suitable 6 oz batt has a thickness of about 1 in. In addition to loft (thickness), the batting material according to the present invention is resiliently compressible, springing back to shape after compression. The batting is also dimensionally stable, i.e., it retains shape and size with washing and drying. The batting has low moisture regain. Even when damp, the batting material according to the present invention absorbs less than about 1%-3% of its weight in moisture and does not clump up. While batting fibers which are short and springy, for example, about 2½ in. in length, drape very well, they tend to be flighty, i.e., tend to leak through the facing, backing and enclosure fabric. Thus, longer, continuous filaments are preferred.

Padding material 30 of roll 14 may include batting material such as batting 28 or fiberfill or both. In any case, the amount of padding material 30 is sufficient to permit roll 14 to be similarly flexible and compliant as bed body 12.

Suitable padding (batting and fiberfill) fibers are nonflammable, nonallergenic, and nontoxic; they are microbiologically resistant and are not weakened by mildew, mold or bacteria, nor do they serve as a food source for moths and beetles. They are not affected by most chemicals, especially bleaches and other oxidizing agents. Suitable fibers include polyester, nylon, acrylic or olefin. Preferred are polyester fibers, such as Mountain Mist, made by the Stearns Technical Textiles Co., Cincinnati, Ohio.

Alternatively, a padding material other than batting or fiberfill, (e.g., beads, foam, etc.) may be used in the interior chamber 24 of bed body 12 or roll 14, provided that the pet bed of the invention maintains the appropriate drape, washability characteristics and other features of the invention.

Figure 5:
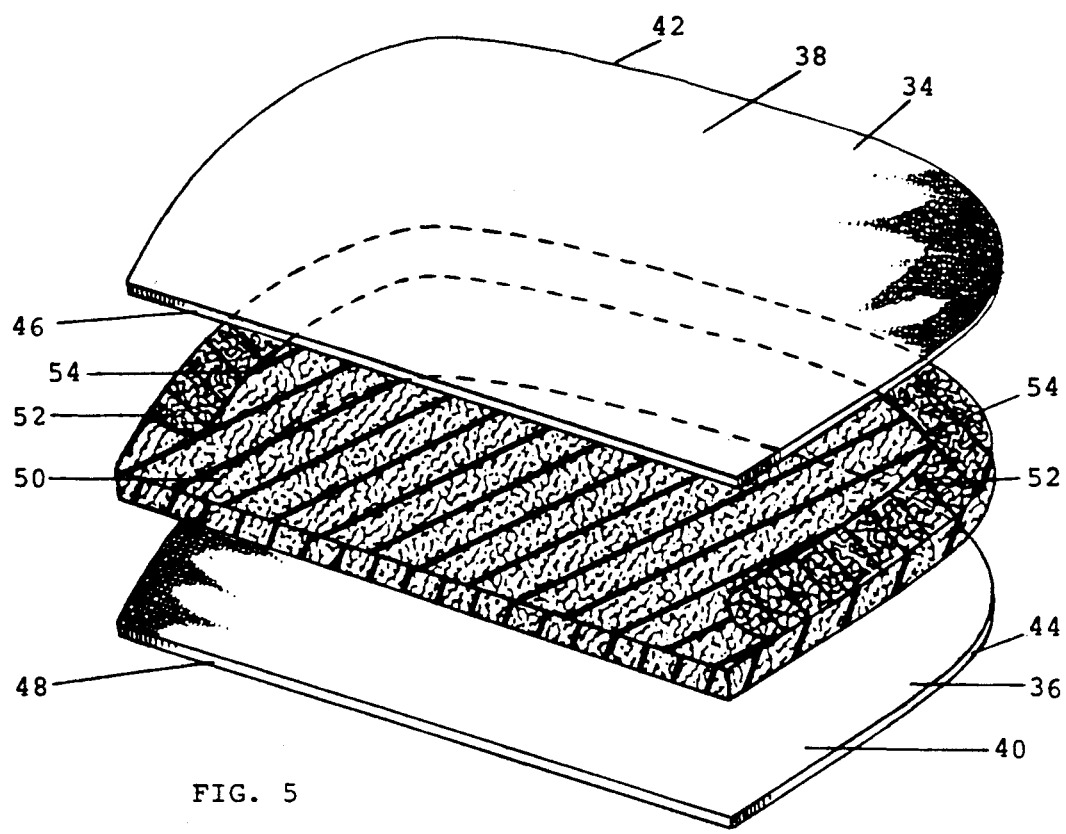
FIG. 5 is an exploded view of the components used in a method of making a pet bed in accordance with the present invention.

To fabricate the pet bed according to the present invention, several options may occur to those skilled in the art. However, a method of fabrication has been developed, which has certain production economies and is particularly well suited for the generally semi-circular shape of the illustrated embodiment. FIG. 5 illustrates the method of fabricating the pet bed. Two congruent panels 34 and 36 of fabric, e.g., a facing 38 and a backing 40, with continuous peripheral edges 42 and 44, respectively, are joined, for example, stitched, together along their edges to form a pocket (not shown), leaving unjoined a portion 46 of facing edge 42 and a portion 48 of backing edge 44. Facing 38 and backing 49 may be the same or different fabric. A batting 50 configured to fit within the pocket is inserted into the pocket. A fiberfill 52 is inserted along the entire inner periphery of the pocket. The facing 38, backing 40 and batting 50 are joined together, e.g., stitched, at an inner edge 54 of the fiberfill 52 to form a roll, as described hereinbefore. Alternatively, the facing 38, backing 40 and batting 50 may be joined together, e.g., stitched, to form a seam which is concentric to and about 1.5 to 3.0 in. from the joined periphery of the pocket to create a seamed space which can then be stuffed with fiberfill 52 to form a roll as described hereinbefore. The open edge of the pocket is then closed, for example, by stitching together edge 46 of facing 38, edge 48 of backing 40 and batting 50. This closed end may also be given a more finished appearance by folding over and stitching the closed edge. Alternatively, the open end of the pocket can be closed by applying a binding to the open edges, or by any other method known in the art.

In summary, the pet bed according to the present invention can be placed on any surface, e.g., a bed, chair, sofa, or floor, and is readily transportable to any surface at any location. The pet bed of the present invention, being compliant and capable of conforming to virtually any surface, can be used on top of the chair or sofa or wherever the pet's "spot" is. The pet bed has sufficient loft so that it provides a degree of comfort for a pet even on a hard surface, such as a floor. The pet can lie on top of the bed body 12 and snuggle against roll 14 and/or rest its head on roll 14.

The pet bed according to the present invention is machine washable and requires no separate cleaning care for the outer fabric material and the inner padding material(s). The pet bed promotes good animal and environmental hygiene. The pet bed also protects the surface of furniture and flooring from damage by the pet. Because of ease of cleaning of the pet bed, buildup of hair, soil and organisms is virtually eliminated. Finally, because of its flexible, nonrigid structure the pet bed is easily stored.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

We claim:

1. A pet bed, comprising: a bed body having a continuous peripheral edge, and a nonremovable roll having a relatively uniform cross section, peripherally joined to said edge to substantially surround said bed body;

said bed body comprising a facing and a backing and having an interior chamber, said facing and backing configured and joined together in face-to-face relationship to define said interior chamber, said interior chamber including a first resiliently compressible padding material;

said roll comprising a second resiliently compressible padding material and an enclosure surrounding and holding said second padding material, said roll having a cross section of greater dimension than the cross section of said bed body;

said facing, said backing and said enclosure comprising a washable fabric;

said peripheral edge of said bed body describing a semicircle having a circular edge portion and a straight edge portion and said roll is peripherally joined only about said circular edge portion; and said pet bed having sufficient drape to generally conform to any surface upon which said pet bed is placed to provide a resting place for a domestic animal.

2. A pet bed for draping on and protecting furniture or a floor, comprising: a bed body having a continuous peripheral edge and including a polyester batting material and a nonremovable roll having a relatively uniform cross section and including a padding material, extending around a major portion of said edge to enclose a major portion of said bed body, said major portion of said edge being circular and a minor portion of said edge being rectilinear, defining said pet bed as substantially semicircular, and said extending around only said major portion.

* * * * *